(12) United States Patent
Erlandson

(10) Patent No.: US 8,320,056 B2
(45) Date of Patent: Nov. 27, 2012

(54) SPATIAL FILTERS FOR HIGH AVERAGE POWER LASERS

(75) Inventor: Alvin C. Erlandson, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 594 days.

(21) Appl. No.: 12/544,988

(22) Filed: Aug. 20, 2009

(65) Prior Publication Data

US 2011/0043899 A1 Feb. 24, 2011

(51) Int. Cl.
- G02B 3/06 (2006.01)
- G02B 11/24 (2006.01)
- G02B 5/20 (2006.01)

(52) U.S. Cl. ......... 359/710; 359/715; 359/717; 359/718

(58) Field of Classification Search .................. 359/710, 359/715, 717, 738
See application file for complete search history.

(56) References Cited

U.S. PATENT DOCUMENTS

| | | | | |
|---|---|---|---|---|
| 3,592,547 A * | 7/1971 | Noble | ............................... | 356/71 |
| 4,043,674 A | 8/1977 | Fletcher et al. | | |
| 4,123,142 A * | 10/1978 | Fleming et al. | .................. | 359/29 |
| 5,263,039 A * | 11/1993 | Skupsky et al. | .................. | 372/25 |
| 5,331,466 A * | 7/1994 | Van Saarloos | ................ | 359/723 |
| 6,913,373 B2 * | 7/2005 | Tanaka et al. | ................. | 362/268 |
| 2008/0205461 A1 | 8/2008 | Henrichs | | |
| 2008/0218752 A1 | 9/2008 | Hagler | | |
| 2008/0273560 A1 | 11/2008 | Stelmakh | | |

OTHER PUBLICATIONS

International Search Report and Written Opinion of PCT Application No. PCT/US10/44408, mailed Sep. 29, 2010, 9 pages total.

Kaempfe et al., "Laser beam filtering by refractive or diffractive microstructures" Current Developments in Lens Design and Optical Engineering VI. Edited by Mouroulis, Pantazis Z.; Smith, Warren J.; Johnson, R. Barry. Proceedings of the SPIE, Aug. 2005; 5874:232-242.

Kurnit et al., "High-damage-threshold pinhole for glass fusion laser applications" 3rd International Conference on Solid-state Lasers for Applications to Inertial Confinement Fusion : SSLA—ICF, Monterey, CA, USA, Jul. 23, 1999; 3492(2):896-900.

* cited by examiner

*Primary Examiner* — Eric Bolda
(74) *Attorney, Agent, or Firm* — Kilpatrick Townsend Stockton LLP

(57) ABSTRACT

A spatial filter includes a first filter element and a second filter element overlapping with the first filter element. The first filter element includes a first pair of cylindrical lenses separated by a first distance. Each of the first pair of cylindrical lenses has a first focal length. The first filter element also includes a first slit filter positioned between the first pair of cylindrical lenses. The second filter element includes a second pair of cylindrical lenses separated by a second distance. Each of the second pair of cylindrical lenses has a second focal length. The second filter element also includes a second slit filter positioned between the second pair of cylindrical lenses.

20 Claims, 7 Drawing Sheets

SPATIAL FILTERS FOR HIGH AVERAGE POWER LASERS

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

High power lasers provide beams of coherent radiation characterized by high beam quality. Preferably, the laser output of a high power laser is characterized by a uniform wavefront. Because they produce high power, coherent radiation, high power laser systems have been used in a wide variety of applications. Industrial applications for high power lasers include laser cutting and welding, laser marking, and the like. In many applications, one of the metrics of interest is the beam intensity, measured in power per area ($W/m^2$) at a focal point. A beam with a uniform wavefront will ideally focus to a diffraction limited spot size. However, as laser beams propagate through laser optics, which are nearly always imperfect, scattering from small-scale obscurations and phase objects cause high-spatial-frequency variations in intensity and wavefront across the beam. Such intensity variations increase risk for optical damage to laser optics, and both intensity variations and wavefront variations increase the laser spot size for subsequently focused laser beams, thereby decreasing the beam intensity. For applications dependent on high beam intensity, this condition is undesirable.

In order to improve beam quality, pinholes have been utilized to spatially filter the laser beam, removing high-spatial-frequency wavefront and intensity variations. Typically, a laser beam is focused using a lens and a pinhole is placed in the focal plane, spatially removing aberrated rays at positions blocked by the pinhole. A second lens is then used to collimate the laser beam, providing a beam with a more uniform intensity and more uniform wavefront suitable for high intensity applications.

Despite the benefits in beam quality provided by pinhole spatial filters, several problems are presented by the use of pinhole filters. Thus, there is a need in the art for improved methods and systems related to spatial filters for high power lasers.

SUMMARY OF THE INVENTION

According to the present invention, techniques related to optical systems are provided. More particularly, an embodiment of the present invention provides a multi-element spatial filter with image relay properties. Merely by way of example, the invention has been applied to a multi-element spatial filter including overlapping sets of cylindrical-lens telescopes paired with orthogonal slit filters. In another illustrative example, the invention has been applied to a spatial filter with astigmatic lenses and orthogonal slit filters. The methods and systems described herein are also applicable to numerous optical systems including lasers, amplifiers, and the like.

According to an embodiment of the present invention, a spatial filter is provided. The spatial filter includes a first filter element and a second filter element overlapping with the first filter element. The first filter element includes a first pair of cylindrical lenses separated by a first distance. Each of the first pair of cylindrical lenses has a first focal length. The first filter element also includes a first slit filter positioned between the first pair of cylindrical lenses. The second filter element includes a second pair of cylindrical lenses separated by a second distance. Each of the second pair of cylindrical lenses has a second focal length. The second filter element also includes a second slit filter positioned between the second pair of cylindrical lenses.

According to another embodiment of the present invention, a spatial filter is provided. The spatial filter includes a first astigmatic lens having a first focal length for a first direction and a second focal length for a second direction orthogonal to the first direction. The spatial filter also includes a first slit filter separated from the first astigmatic lens by the first focal length and a second slit filter separated from the first astigmatic lens by the second focal length. The spatial filter further includes a second astigmatic lens having a third focal length for the first input direction and a fourth focal length for the second input direction.

According to a specific embodiment of the present invention, a double pass amplifier is provided. The double pass amplifier includes a gain medium having an input portion and a reflective portion, a reflective element optically coupled to the reflective portion, and a beam path optically coupled to the input portion. The double pass amplifier also includes a first set of cylindrical lenses disposed along the beam path. The first set of cylindrical lenses are oriented orthogonally. The double pass amplifier further includes a set of apertures disposed along the beam path. The set of apertures are oriented orthogonally. Moreover, the double pass amplifier includes a second set of cylindrical lenses disposed along the beam path. The second set of cylindrical lenses are oriented orthogonally. Furthermore, the double pass amplifier includes an injection mirror positioned between the set of apertures and the second set of cylindrical lenses.

According to another specific embodiment of the present invention, a multi-pass amplifier is provided. The multi-pass amplifier includes a gain medium having an input portion and a reflective portion, a reflective element optically coupled to the reflective portion, a beam path optically coupled to the input portion, and a first set of cylindrical lenses disposed along the beam path. The first set of cylindrical lenses are oriented orthogonally. The multi-pass amplifier also includes a set of apertures disposed along the beam path. The set of apertures are oriented orthogonally. The multi-pass amplifier further includes a second set of cylindrical lenses disposed along the beam path. The second set of cylindrical lenses are oriented orthogonally. Moreover, the multi-pass amplifier includes an injection mirror positioned between the set of apertures and the second set of cylindrical lenses, a first isolation loop mirror positioned between the set of apertures and the second set of cylindrical lenses, a second isolation loop mirror positioned between the set of apertures and the second set of cylindrical lenses, and an isolation loop operable to receive light from the first isolation loop mirror and to direct light to the second isolation loop mirror.

According to a particular embodiment of the present invention, a multi-pass amplifier is provided. The multi-pass amplifier includes input optics operable to direct a beam along an optical path, and a gain medium disposed along the optical path. The multi-pass amplifier also includes a spatial filter disposed along the optical path. The spatial filter includes a first filter element and a second filter element overlapping with the first filter element. The first filter element includes a first pair of cylindrical lenses separated by a first distance. Each of the first pair of cylindrical lenses has a first focal length. The first filter element also includes a first slit filter positioned between the first pair of cylindrical lenses. The second filter element includes a second pair of cylindrical lenses separated by a second distance. Each of the second pair of cylindrical lenses has a second focal length. The second filter element also includes a second slit filter positioned between the second pair of cylindrical lenses. The multi-pass amplifier further includes output optics disposed along the optical path.

Numerous benefits are achieved by way of the present invention over conventional techniques. For example, the present systems provide spatial filters that filter out intensity and phase variations above a predetermined spatial frequency. Additionally, embodiments of the present invention provide for image relaying, which restores the laser wavefront at a downstream object plane. Moreover, embodiments of the present invention provide for maintenance of beam quality in high repetition rate pulsed laser systems. Furthermore, some embodiments reduce the vacuum requirements for the laser system, thereby reducing costs and pump-down times in comparison with conventional systems. Depending upon the embodiment, one or more of these benefits may be achieved. These and other benefits will be described in more detail throughout the present specification and more particularly below.

These and other objects and features of the present invention and the manner of obtaining them will become apparent to those skilled in the art, and the invention itself will be best understood by reference to the following detailed description read in conjunction with the accompanying drawings.

DETAILED DESCRIPTION OF SPECIFIC EMBODIMENTS

Figure 1:
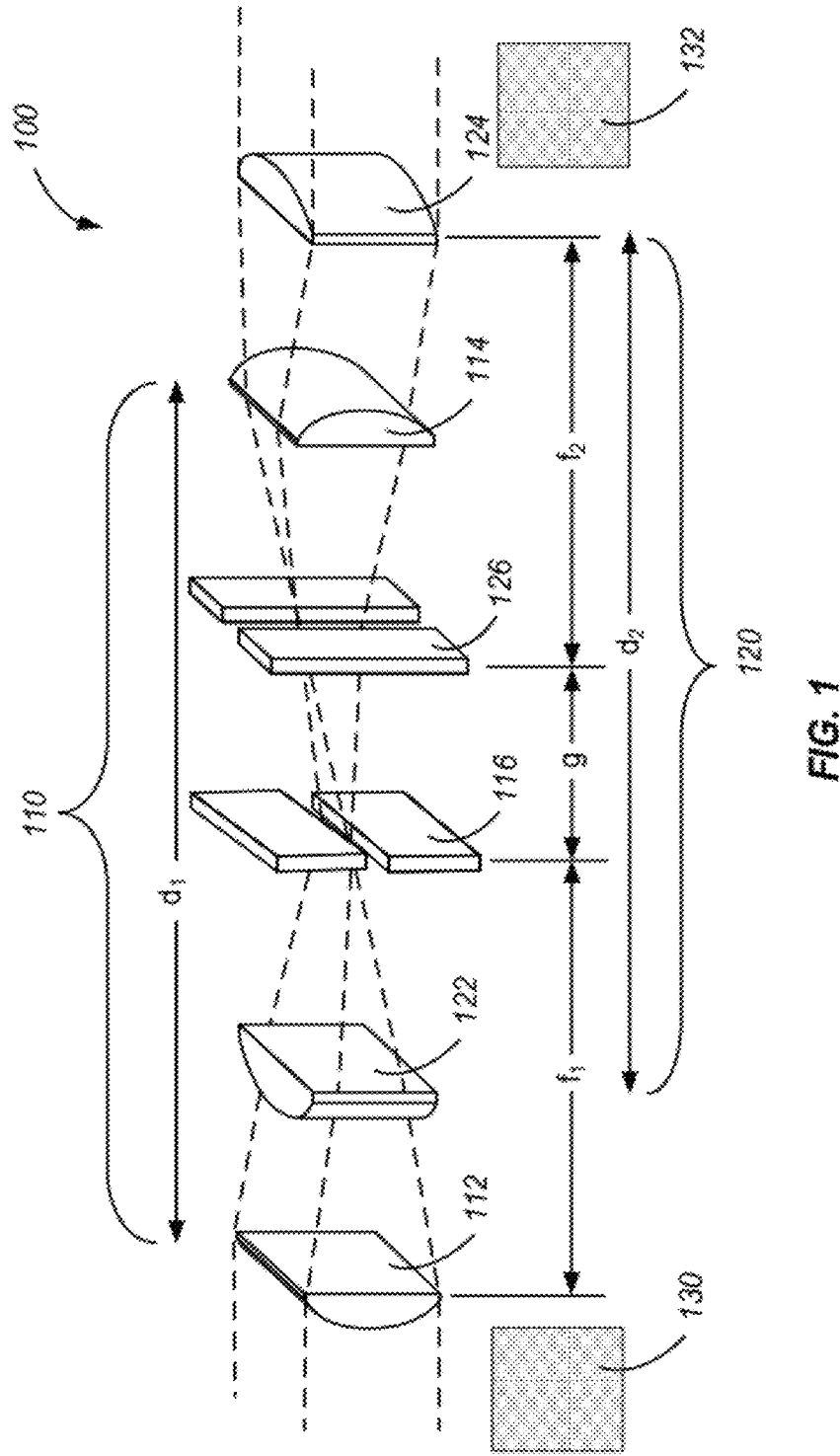
FIG. 1 is a simplified diagram of a spatial filter according to an embodiment of the present invention.

As discussed above, pinhole spatial filters have been utilized in some high power laser applications. However, pinhole spatial filters present several problems in the context of high power laser systems. Because of the high intensities associated with some high power lasers, sputtering of the material surrounding the center of the pinhole can result during operation, producing sputtered materials that may contaminate optics. Contamination of lenses by sputtered material can result in increases in laser absorption by the lenses, eventually resulting in damage to the lens. Such contamination problems are particularly troublesome in pulsed applications, where frequent sputtering events can result in pinhole wearout, with the open area at the center of the pinhole expanding as a function of time. Over time, pinhole wearout results in decreases in beam quality and system performance.

Another problem presented by the use of pinhole spatial filters for high power lasers is pinhole closure, in which the beam's electric field at the pinhole exceeds the breakdown threshold in air, resulting in plasma generation at the pinhole and the absorption or refraction of the laser light. Refraction by plasmas is harmful as the plasma tends to be nonuniform, causing wavefront distortion of the laser beam. Pinhole closure also occurs when the laser-beam intensity at the edge of the pinhole is sufficient to ablate material into the laser beam, where the ablated material may also be turned into plasma. Pinhole closure from the breakdown of air causes immediate pinhole closure, while pinhole closure from ablated material occurs after a period of several tens of nanoseconds, sufficient for the ablated material to travel into the beam. The absorption or refraction of the laser beam by the plasma or ablated material prevents the propagation of long pulses (e.g., longer than the pinhole closure time of tens of nanoseconds) through the pinhole. Additionally, in a pulsed application, if the plasma is not dissipated before arrival of the next laser pulse, this subsequent pulse can experience absorption or refraction in the plasma, impairing pulsed applications in addition to long-pulse applications.

A potential solution to plasma creation and the pinhole closure problem is to place the pinhole in a vacuum. The reduction in gas pressure at the pinhole will reduce the level of plasma production, potentially solving the pinhole closure problem. However, the present inventor has determined that laser beams operating in vacuum or near-vacuum conditions at visible or ultraviolet wavelengths are associated with degradation of optical coatings. Since coatings are utilized to reduce reflections within the optical system, such degradation is problematic. Without limiting the scope of the present invention, the inventor believes that exposure of optics to visible laser light in vacuum conditions sometimes results in oxygen present in the optical coatings being driven out of the optical coatings by the visible laser light. The oxygen-poor materials remaining in the coatings then absorb light and adverse impacts to performance result.

FIG. 1 is a simplified diagram of a spatial filter according to an embodiment of the present invention. The spatial filter 100 illustrated in FIG. 1 includes two overlapping filter elements: a first filter element 110 and a second filter element 120. The first filter element 110 includes a first cylindrical lens 112 and a second cylindrical lens 114. The first cylindrical lens 112 and the second cylindrical lens 114 are separated by a first distance $d_1$. Both the first cylindrical lens and the second cylindrical lens are characterized by a first focal length ($f_1$). The first filter element also includes a first slit filter 116 that is oriented in a horizontal configuration and positioned between the first cylindrical lens 112 and the second cylindrical lens 114. The first cylindrical lens 112 is oriented to focus light rays passing through the lens in a vertical plane and pass light rays with no focusing action in the horizontal plane. A plane wave passing through the first cylindrical lens will form a slit shaped beam at the focal plane, which is aligned with the first slit filter 116. Preferably, the majority of the power in the slit shaped beam will pass through the first slit filter 116. The light passing through the first slit filter 116 diverges in the vertical plane and is collimated by the second cylindrical lens 114. The first filter element 110 may be referred to as a vertical filter.

The spatial filter also includes a second filter element 120 that overlaps with the first filter element 110. The second filter element 120 includes a third cylindrical lens 122 and a fourth cylindrical lens 124 separated by a second distance $d_2$. Both the third cylindrical lens and the fourth cylindrical lens are characterized by a second focal length ($f_2$). The second filter element also includes a second slit filter 126 that is oriented in a vertical configuration and positioned between the third cylindrical lens 122 and the fourth cylindrical lens 124. The third cylindrical lens 122 is oriented to focus light rays passing through the lens in a horizontal plane and pass light rays with no focusing action in the vertical plane. A plane wave passing through the third cylindrical lens will form a slit shaped beam at the focal plane, which is aligned with the second slit filter 126. Preferably, the majority of the power in the slit shaped beam will pass through the second slit filter 126. The light passing through the second slit filter 126 diverges in the horizontal plane and is collimated by the fourth cylindrical lens 124. The second filter element 120 may be referred to as a horizontal filter.

The distance between the first slit filter and the second slit filter is a predetermined distance g. Thus, the distance between line foci is equal to the predetermined distance g. The distance g determines the long dimension of the slit-shaped beams at the two slit filters, 116 and 126. Consequently, g also determines the beam intensity at these slit filters. In the embodiment illustrated in FIG. 1, the distance g is less than the focal length of the cylindrical lenses.

The spatial filter illustrated in FIG. 1 provides for a particular version of image relaying in which a beam aspect ratio at the first cylindrical lens 112, illustrated by beam cross-section 130 is equal to the beam aspect ratio at the fourth cylindrical lens 124, illustrated by beam cross-section 132.

Referring to FIG. 1, a specific embodiment of the present invention utilizes cylindrical lenses that are characterized by the same focal length, that is, $f_1 = f_2 = f$. In this embodiment, the distance $d_1$ is equal to 2f and the distance $d_2$ is equal to 2f and the distance between the first cylindrical lens and the fourth cylindrical lens is equal to 2f+g. In the illustrated configuration, the total relay distance is equal to 4f and the total relay distance outside the spatial filter is equal to 4f−2f−g=2f−g. Accordingly, this specific embodiment relays images without changing the beam aspect ratio. FIG. 1 should be regarded as exemplary, as embodiments in which the beam size is magnified, demagnified, or the beam aspect ratio is changed are also possible. For example, it will be appreciated that variations in the focal lengths can be provided in order to relay images and to provide a desired magnification or change in aspect ratio. One of ordinary skill in the art would recognize many variations, modifications, and alternatives.

The orientation of the first pair of cylindrical lenses is orthogonal to the orientation of the second pair of cylindrical lenses in each filter element. Additionally, the orientation of the first slit filter is orthogonal to the second slit filter. Thus, in the configuration illustrated in FIG. 1, the first filter element is orthogonal to the second filter element. Thus, the combination of cylindrical lenses and filters provide for spatial filtering of the light beam incident on the first cylindrical lens in both horizontal and vertical directions, but using slit filters characterized by reduced beam intensity at the filters. This contrasts with conventional approaches in which a pinhole is utilized, and the resulting high beam intensities at the pinhole, which result in sputtering of pinhole materials, pinhole closure, and the other problems discussed above. The techniques described herein contrast with approaches using slit filters in which either: 1) only one filtering element is used, so that filtering occurs only in one direction; or 2) two filtering elements are used, but in a configuration in which the slit filters are not overlapped to accomplish image relaying. Additionally, embodiments of the present invention contrast with approaches using two spherical lenses that are tilted to impose astigmatism on the beam and two slit filters that are oriented orthogonally to each other. Specifically, embodiments of the present invention illustrated herein that use pairs of cylindrical lenses or astigmatic lenses effect much greater reductions in intensity at the slit filters, thereby allowing higher power beams to be filtered without generating beam-distorting or beam-absorbing plasma or causing ablation of material from the edges of the slit filters.

Figure 2A:
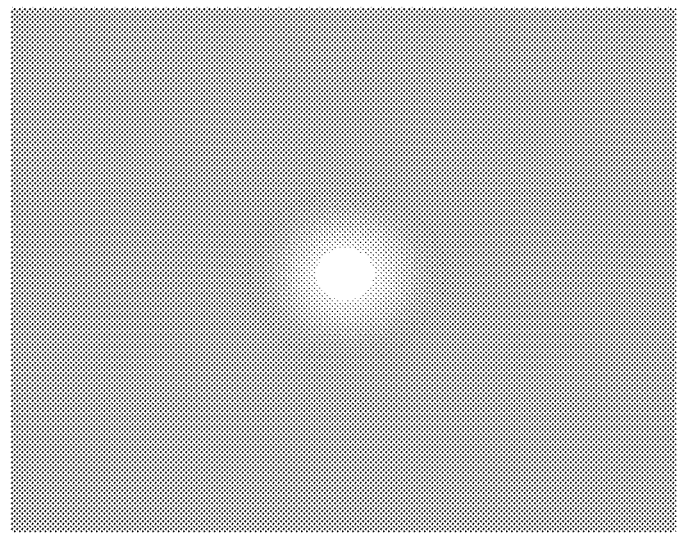
FIG. 2A is a simplified illustration showing light intensity as a function of position for a round aperture.
Figure 2B:
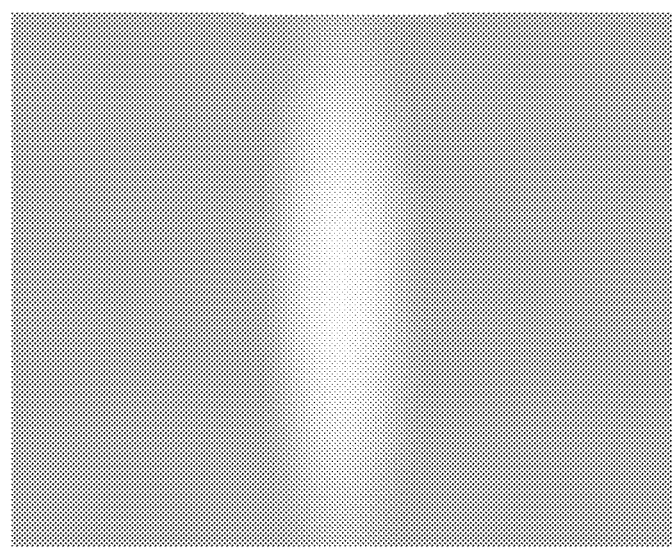
FIG. 2B is a simplified illustration showing light intensity as a function of position for a slit aperture.

FIG. 2A is a simplified illustration showing light intensity as a function of position for a round aperture. For the round focal spot illustrated in FIG. 2A, a high fluence is produced, a condition associated with conventional spatial filters utilizing round pinhole apertures and spherical lenses. The beam intensity at the pinhole can be referred to as $I_{spot}$. FIG. 2B is a simplified illustration showing light intensity as a function of position for a slit aperture. In contrast with the irradiance pattern for the round focal spot illustrated in FIG. 2A, the beam intensity at the slit aperture is that associated with a line focus. The line focus produced using cylindrical lenses provides a reduced fluence in comparison with the round focal spot. For example, for a slit width equal to the pinhole diameter d, and for a cylindrical-lens focal length equal to the spherical-lens focal length, the beam intensity at the slit aperture is approximately equal to $I_{spot} \cdot (d/L)$, where L is the slit length. Since the slit length is much greater than the slit width, the beam intensity for the slit aperture is greatly reduced in comparison with the round pinhole aperture. Thus, utilizing cylindrical lenses and slit apertures as illustrated in the spatial filter in FIG. 1, line foci with reduce beam intensity are provided, reducing irradiance and fluence to levels below the threshold for plasma production and damage to the optical elements.

Utilizing embodiments of the present invention, the beam intensity in the plane of the spatial filter elements (i.e., the slit filters) can be reduced by about two orders of magnitude. For example, in a laser beamline with a 40-cm×40-cm aperture, by using 1.5-mm×20-cm slits rather than 1.5-mm pinholes, irradiance and fluence on the edge of the spatial filter aperture is reduced by over 100 fold. In the embodiments described herein, using slit filters rather than pinhole filters will reduce the peak irradiance on aperture walls to a level below the plasma threshold. Typically, the threshold for plasma production is on the order of 100 GW/cm$^2$. Embodiments of the present invention can reduce the peak irradiance to a value on the order of a few tens of GW/cm$^2$ or less, well below the threshold for plasma production. As a result, gas pressure in the optical system can be increased without exceeding the threshold for optical breakdown due to plasma generation. In particular, reduced vacuum requirements will reduce operating costs as well as system pump-down times, significant advantages for system operators. Moreover, issues related to deposition of materials on optics (e.g., metallization of optics) can potentially be addressed by addition of oxygen or other suitable gases to the optical system.

Additionally, the peak fluence on aperture walls in embodiments of the present invention is reduced to a level below damage thresholds for many materials. For example, the threshold for optical damage for NG-4 glass walls at grazing incidence is ~5 kJ/cm$^2$ at 5 ns. Embodiments of the present invention reduce the peak fluence to values on the order of a few hundred joules per square centimeter or less, well below the threshold for optical damage to NG-4 glass in the conditions above. Thus, using slit apertures with glass-lined tapered walls has good prospects for avoiding both plasma production and optical damage.

Figure 3:
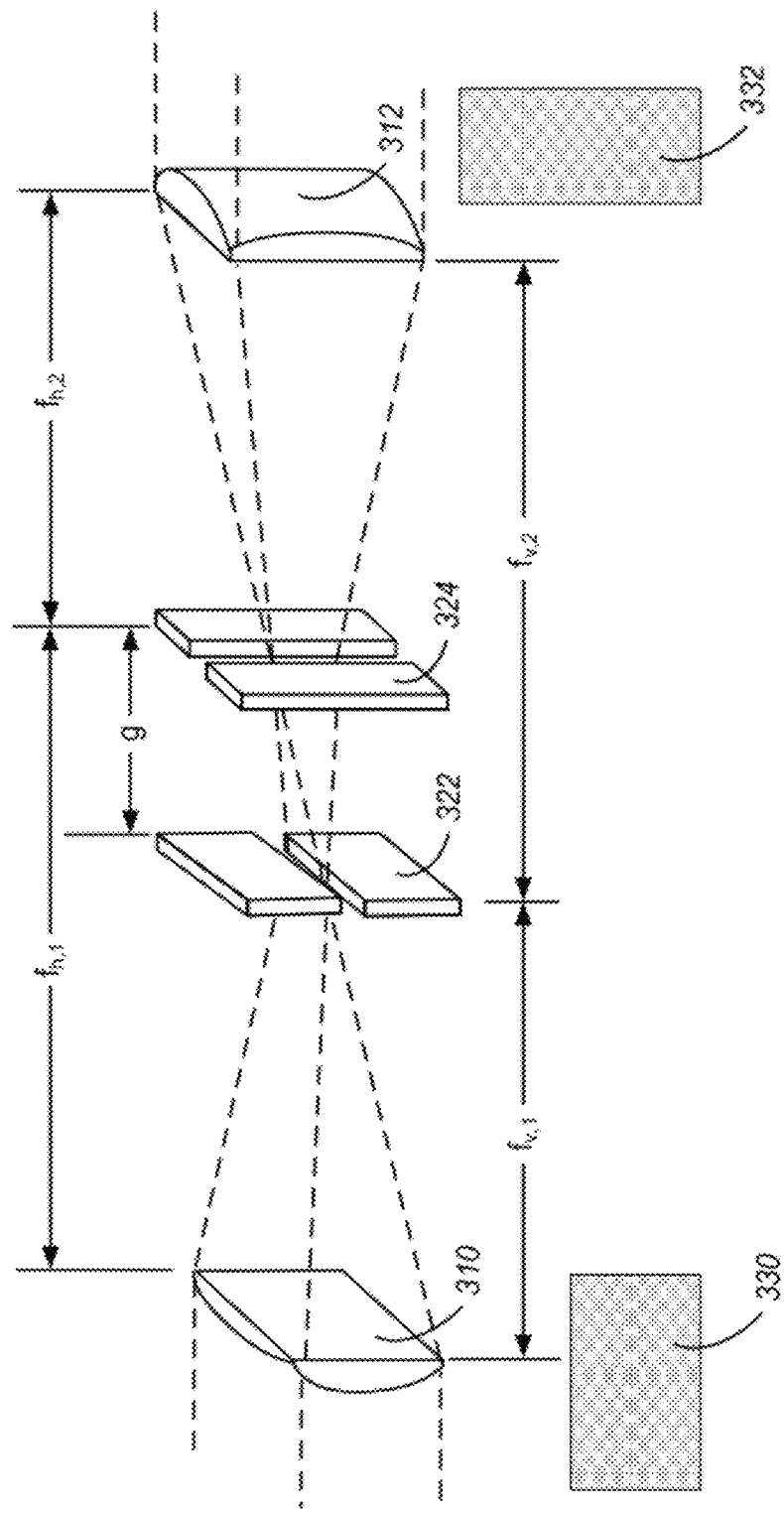
FIG. 3 is a simplified diagram of a spatial filter according to another embodiment of the present invention.

FIG. 3 is a simplified diagram of a spatial filter according to another embodiment of the present invention. In the embodiment illustrated in FIG. 3, the pairs of cylindrical lenses have been replaced with astigmatic lenses that have focusing power in both the vertical and horizontal directions. Referring to FIG. 3, the spatial filter includes a first astigmatic lens 310 having a first focal length $f_{v,1}$ for focusing in the vertical direction and a second focal length $f_{h,1}$ for focusing in the horizontal direction, i.e., orthogonal to the vertical direction. In the example illustrated in FIG. 3, the vertical direction can be referred to as a first input direction and the horizontal direction can be referred to as a second input direction. The focal lengths for the two directions are different, with the focal length $f_{h,1}$ being greater than the focal length $f_{v,1}$.

A first slit filter 322 is positioned along the optical path and separated from the first astigmatic lens 310 by first focal length $f_{v,1}$. As illustrated in FIG. 3, the collimated beam incident on the first astigmatic lens is focused in the vertical direction, enabling the focused beam to pass through the first slit filter 322. A second slit filter 324 is also positioned along the optical path and separated from the first astigmatic lens by the second focal length $f_{h,1}$. The collimated beam incident on the first astigmatic lens is thus focused in the horizontal direction, enabling the focused beam to pass through the second slit filter 324. The first slit filter 322 and the second slit filter 324 are separated by a distance g. As illustrated in FIG. 3, the first slit filter and the second slit filter are orthogonal to each other. The distance g is the difference in focal lengths in the two orthogonal directions, $f_{h,1}$ and $f_{v,1}$.

As the beams pass through the first and second slit filters 322 and 324, the beams diverge until reaching a second astigmatic lens 312 having a third focal length $f_{v,2}$ for the first input (e.g., vertical) direction and a fourth focal length $f_{h,2}$ for the second input (e.g., horizontal) direction. The focal lengths for the two direction are different, with the focal length $f_{h,2}$ being less than the focal length $f_{v,2}$. The beam is collimated by the second astigmatic lens 312.

The spatial filter illustrated in FIG. 3 provides for image relaying when the focal lengths $f_{h,2}$ and $f_{v,1}$ are equal, and when the focal lengths $f_{v,2}$ and $f_{h,1}$ are equal. In this case, the total relay distance R is:

$$R=(1-m^2)t+(1-m)L,$$

where $m=f_{v,2}/f_{v,1}=f_{h,1}/f_{h,2}$, $L=f_{v,1}+f_{v,2}=f_{h,1}+f_{h,2}$, and t is then distance between the input image plane and the first lens 310. In both these equations for m and L, the focal lengths are different in the vertical and horizontal directions.

Figure 4:
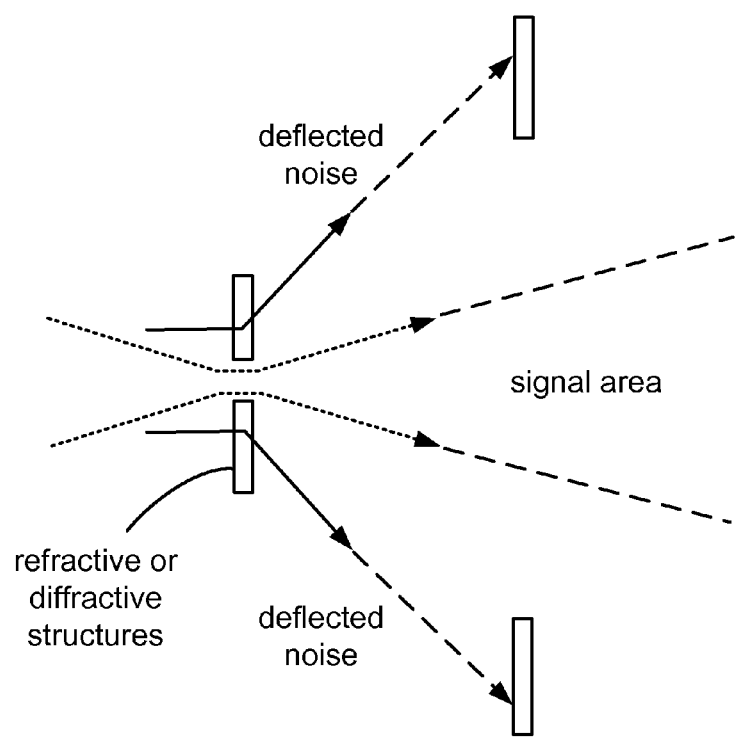
FIG. 4 is a simplified diagram of filtering using refractive or diffractive structures according to an embodiment of the present invention.

The image relaying provided by the spatial filter illustrated in FIG. 3 varies in some respects from that illustrated in FIG. 1. For example, although the cross-sectional areas of the input and output beams are equal in FIG. 3, the beam dimensions are altered, with the input beam having a beam cross-section 330 oriented with a long direction being horizontal and the output beam having a beam cross-section 332 oriented with a long direction being vertical. It should be noted that when the input beam is square, the output beam is also square. Moreover, although the lenses illustrated in FIG. 3 and FIG. 4 are rectangular (e.g., square), embodiments of the present invention may utilize round lenses or lenses of other shapes as appropriate to the particular application. One of ordinary skill in the art would recognize many variations, modifications, and alternatives.

FIG. 4 is a simplified diagram of filtering using refractive or diffractive structures according to an embodiment of the present invention. FIG. 4 should be regarded as exemplary, as refractive, diffractive, absorptive, and reflective structures for filtering are applicable to embodiments of the present invention. For example, it has been proposed that circular structures that use refraction or diffraction to filter out high order spatial frequencies can be used in spatial filters using spherical lenses. Linear versions of such refractive or diffractive structures can be used in embodiments of the present invention or in combination with the cylindrical or astigmatic lenses discussed herein. One of ordinary skill in the art would recognize many variations, modifications, and alternatives.

Figure 5:
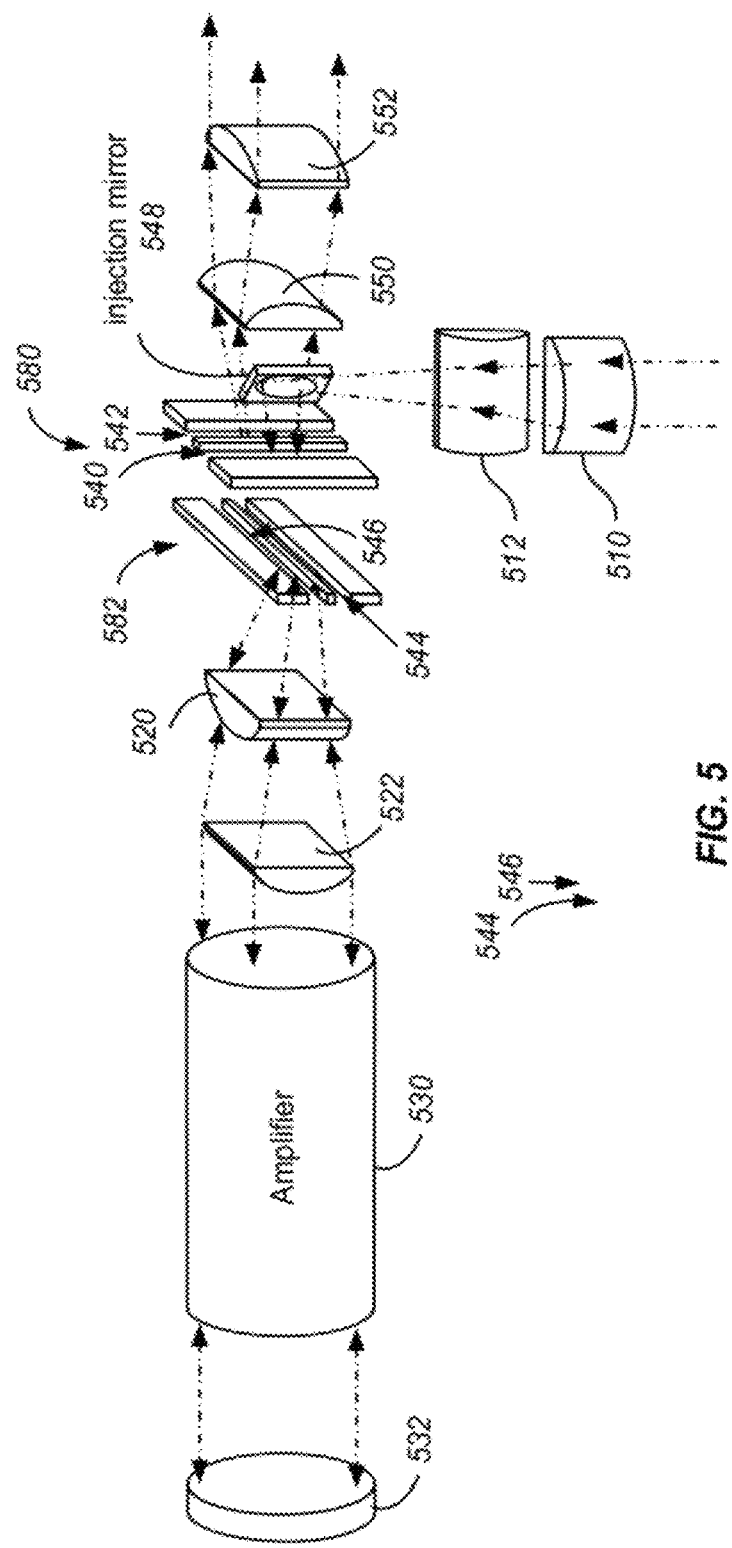
FIG. 5 is a simplified diagram of a double pass amplifier utilizing a spatial filter provided by an embodiment of the present invention.

FIG. 5 is a simplified diagram of a double pass amplifier utilizing a spatial filter provided by an embodiment of the present invention. In the embodiment illustrated in FIG. 5, light to be amplified is injected into the amplifier using a set of orthogonal cylindrical lenses 510 and 512. These orthogonal cylindrical lenses are aligned so that a collimated beam is focused into a converging beam as it propagates towards injection mirror 548. The injection mirror is positioned so that it is close to the far field for one dimension and in the near field for the other dimension.

The injection mirror turns the injected beam, which then passes through vertical input slit 540. A vertically oriented double-slit element 580 includes input slit 540 and output slit 542. A second double-slit element 582 is a oriented horizontally and includes two slit apertures, input slit 544 and output slit 546. The vertically and horizontally oriented double-slit elements form orthogonal input/output slit pairs as discussed in relation to FIGS. 1 and 3. After passing through the orthogonal input slit pair 540/544, the light is focused through orthogonal cylindrical lenses 520 and 522. The collimated beam makes two passes through the gain medium referenced as amplifier 530. The gain medium (also referred to as gain material) may be one of several different materials including Nd:YAG, Nd:Glass, Ti:Sapphire, Yb:YAG, Yb:Glass, Yb:S-FAP, Tm:YAG, Er:YAG, Ho:YAG, $Nd:SrF_2$, or the like. A reflective element 532, such as a mirror or grating, is used to reflect the light after the first pass through the gain medium in order to provide a second pass through the gain medium. Reflective elements other than mirrors can be utilized, including gratings or the like.

After passing a second time through the gain medium 530, the amplified light is focused a second time through the orthogonal lens pair 520/522 and propagates along the beam path to the set of output slits 546 and 542. Referring to FIG. 1, the spacing between cylindrical lens 522 and horizontally oriented output slit 546 is equal to the focal length of cylindrical lens 522. After passing through vertically oriented output slit 542, the amplified and spatially filtered light is focused by cylindrical lens pair 550 and 552, which are orthogonal cylindrical lenses. The spacing between cylindrical lens 520 and vertically oriented slit 542 is equal to the focal length of cylindrical lens 520, the spacing between cylindrical lens 550 and horizontally oriented slit 546 is the focal length of cylindrical lens 550, and the spacing between cylindrical lens 552 and vertically oriented slit 542 is equal to the focal length of cylindrical lens 552. Relaying of images is provided by the optical system along the beam path between cylindrical lens 522 and cylindrical lens 552.

Referring to FIGS. 1 and 5, similarities in the design between the spatial filters can be appreciated. The orthogonal lens pair 522/520 corresponds to the orthogonal lens pair 112/122 and the orthogonal lens pair 550/552 corresponds to the orthogonal lens pair 114/124. The orthogonal slit filters in FIG. 5 are provided in a double-slit configuration to allow for different input and output beam paths, but generally correspond to the horizontal/vertical slit filters 116/126. Thus, the benefits of the spatial filter illustrated in FIG. 1 are available in the double pass amplifier system illustrated in FIG. 5. The optical system illustrated in FIG. 5 provides for an unchanged beam aspect ratio in which the cross-section of the beam at cylindrical lens 522 is equal to the cross-section of the beam at cylindrical lens 552. In the design illustrated in FIG. 5, injection mirror sizes are increased in comparison with conventional input mirrors, enabling the input mirrors to be operated at lower fluences for a given power level or at higher power for a given fluence level.

In the double pass amplifier system illustrated in FIG. 5, the injection mirror is positioned between the set of slit apertures and the set of orthogonal cylindrical lenses 550/552. This particular optical design is not required by the present invention and other input mirror locations are included within the scope of the present invention. Although sets of cylindrical lenses are utilized in the embodiment illustrated in FIG. 5, astigmatic lenses could also be utilized as discussed in relation to FIG. 3.

Figure 6:
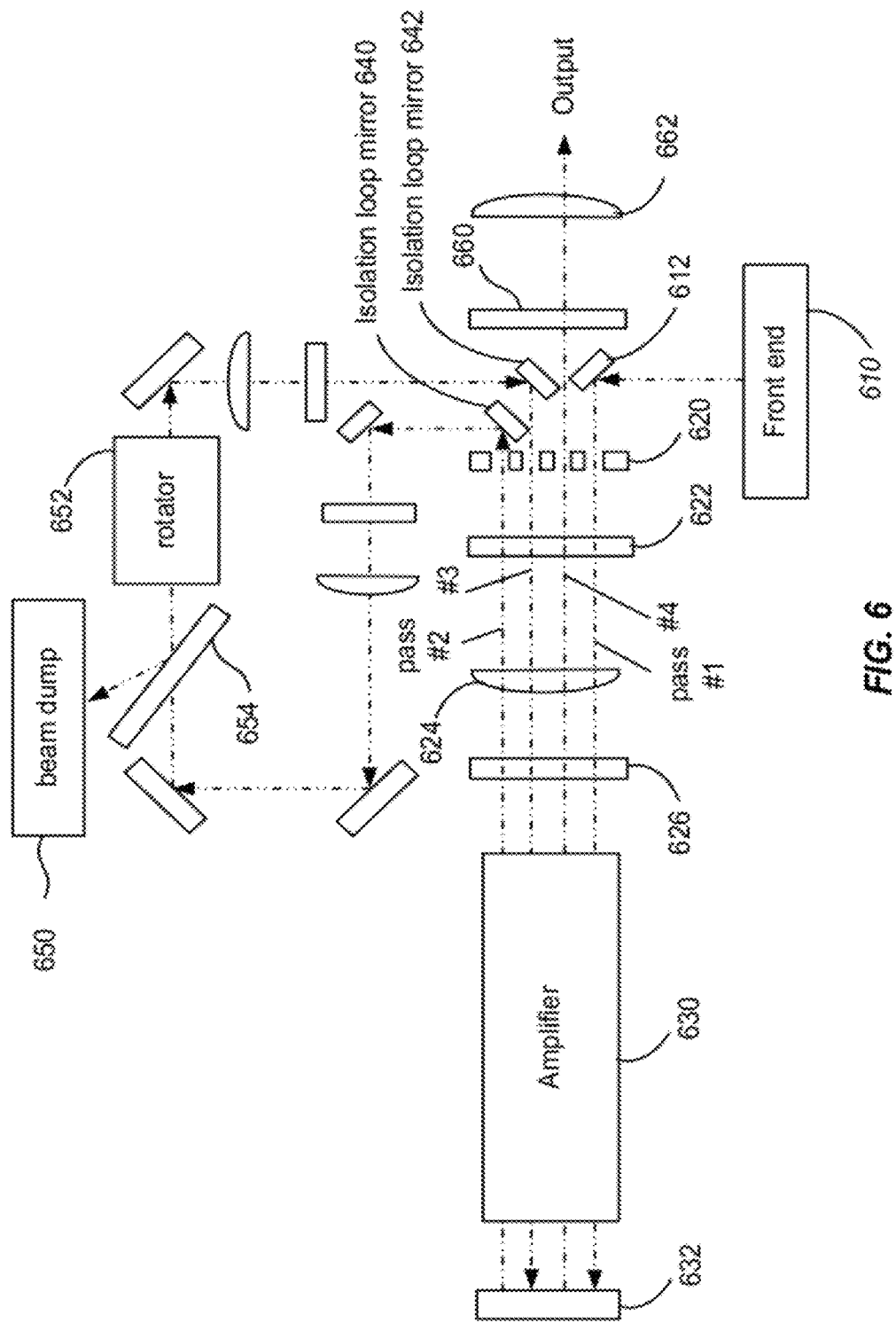
FIG. 6 is a simplified diagram of a multi-pass amplifier utilizing a spatial filter provided by an embodiment of the present invention.

FIG. 6 is a simplified diagram of a multi-pass amplifier utilizing a spatial filter provided by an embodiment of the present invention. The multi-pass amplifier illustrated in FIG. 6 provides for protection against backward propagating pulses. Referring to FIG. 6, an implementation of a multiple pass (i.e., four pass) amplifier utilizing a spatial filter as described herein is illustrated. The multiple pass amplifier illustrated in FIG. 6 includes a spatial filter including the pair of orthogonal cylindrical lenses 624 and 626, horizontally oriented multiple slit filter element 622, vertically oriented multiple slit filter element 620, and a second pair of orthogonal cylindrical lenses 660 and 662. The spatial filter shares some similarities with the spatial filter illustrated in FIG. 5 as well as some differences.

A front end optical system 610 provides the input beam for the amplifier. The front end optical system can include one or more free-space and fiber-based optical components, including one or more laser sources. The light beam may be focused by elements in the front end optical system to provide a converging beam propagating toward injection mirror 612. The injection mirror 612 is used to inject light into the amplifier beam path. The light passes through a vertically oriented slit filter that is one of four slits provided in multiple slit filter element 620. In a manner similar to the double-slit element 580, multiple slits are used to spatially filter the light beam as it propagates through the system in a multi-path manner.

A horizontally oriented multiple slit filter element 622 is disposed along the beam path and light passes through a first slit of the four slits along beam path #1 (i.e., pass #1) toward cylindrical lens 624. Two cylindrical lenses 624 and 626 are oriented orthogonally and form a pair of orthogonal cylindrical lenses. Light passes along path #1 through the amplifier 630 a first time, reflecting off of reflective structure (e.g., a mirror) 632. After the second pass through the amplifier 630, the amplified light passes through the set of orthogonal cylindrical lenses 626/624 and then through a second slit of the horizontally oriented multiple slit filter element 622 and a second slit of the vertically oriented multiple slit filter element 620. The beam path for this second pass is referenced by pass #2 in FIG. 6. The amplifier material can be any suitable gain materials, for example, Nd:YAG, Nd:Glass, or the like. Additionally, the reflective element can be a mirror, a grating, or other suitable reflectors.

In order to provide for backward propagating pulse protection, an optical assembly is provided along an optical path between a first isolation-loop mirror 640 and a second isolation-loop mirror 642. The isolation loop isolates (or protects) the laser front end from pulses reflected back to the laser system by the target. The optical assembly includes mirrors, lenses, a rotator 652, which may be one of several types of polarization rotators such as a Pockels cell, a Faraday rotator, or the like. If necessary, the polarization is rotated back to its original state prior to injection back into the amplifier using a second rotator or combination of mirrors (not shown). The beam is re-injected using the second isolation-loop mirror 642. Backward propagating waves propagating backwards along path #4, then path #3, then reflecting off of second isolation-loop mirror 642 will be reflected by polarizer 654 and directed into beam dump 650.

Light to be amplified is reflected from the second isolation-loop mirror 642 and propagates along path #3, passing through a third slit of the vertically oriented multiple slit filter element 620 and a third slit of the horizontally oriented multiple slit filter element 622. The third path passes through the set of orthogonal cylindrical lenses 624/626, through the amplifier 630 for a third time, reflects off reflective element 632, and makes a fourth pass through the amplifier. Propagating along path #4, the amplified light passes through the set of orthogonal cylindrical lenses 626/624, through the fourth slit of the horizontally and vertically oriented filter elements 622 and 620, and then through a second set of orthogonal cylindrical lenses 660 and 662. The output of the amplifier is provided after passing through cylindrical lens 662.

Utilizing the amplifier illustrated in FIG. 6, the fluences at the isolation-loop mirrors 640 and 642 are reduced in comparison with conventional designs. Thus, relative to spatial filters utilizing spherical lenses and pinholes, the isolation-loop mirrors are likely to have greater lifetimes as a result of these lower fluences. Additionally, the embodiment illustrated in FIG. 6 will reduce the contamination of optics by debris. Moreover, the use of the spatial filters provided by embodiments of the present invention will allow greater backward propagating pulse energy to be tolerated without damaging the isolation-loop mirrors and other optics. Although sets of cylindrical lenses are utilized in the embodiment illustrated in FIG. 6, astigmatic lenses could also be utilized as discussed in relation to FIG. 3.

The cylindrical lenses utilized in embodiments of the present invention provide additional benefits related to back reflections in comparison with conventional spherical lenses. Using a spherical lens and a pinhole filter, reflections from the spherical lens, which is preferably oriented perpendicular to the beam path, will reflect at normal incidence and travel back through the pinhole filter, resulting in intense beams, sometimes referred to as "pencil beams," that can be amplified to high intensity in gain media. Thus, gain depletion by amplification of these backward propagating waves as well as damage to optical components due to the high intensity of these backward propagating waves can result.

When spherical lenses are tilted (not positioned perpendicular to the beam path) in order to reduce the back reflections, the shape of the spherical lens will result in a new portion of the lens being normal to the incident beam, allowing some part of the beam to be reflected as a backward propagating wave. Thus, backward propagating waves and the resulting problems are not readily solved by tilting of spherical optics.

In contrast, the tilting of cylindrical lenses greatly reduces the backward propagating waves produced by back reflections. With the plane side of a plano-convex cylindrical lens facing the incident beam, tilting of the cylindrical lens will cause the incoming beam to be reflected at an angle with respect to the beam path, resulting in the backward propagating light being blocked by non-central portions of the slit filter. Typically, a tilt angle on the order of d/2f is sufficient to cause backward propagating light to be blocked, where d is the slit width in the narrow direction and f is the focal length of the cylindrical lens (and the distance from the slit aperture to the cylindrical lens).

Figure 7:
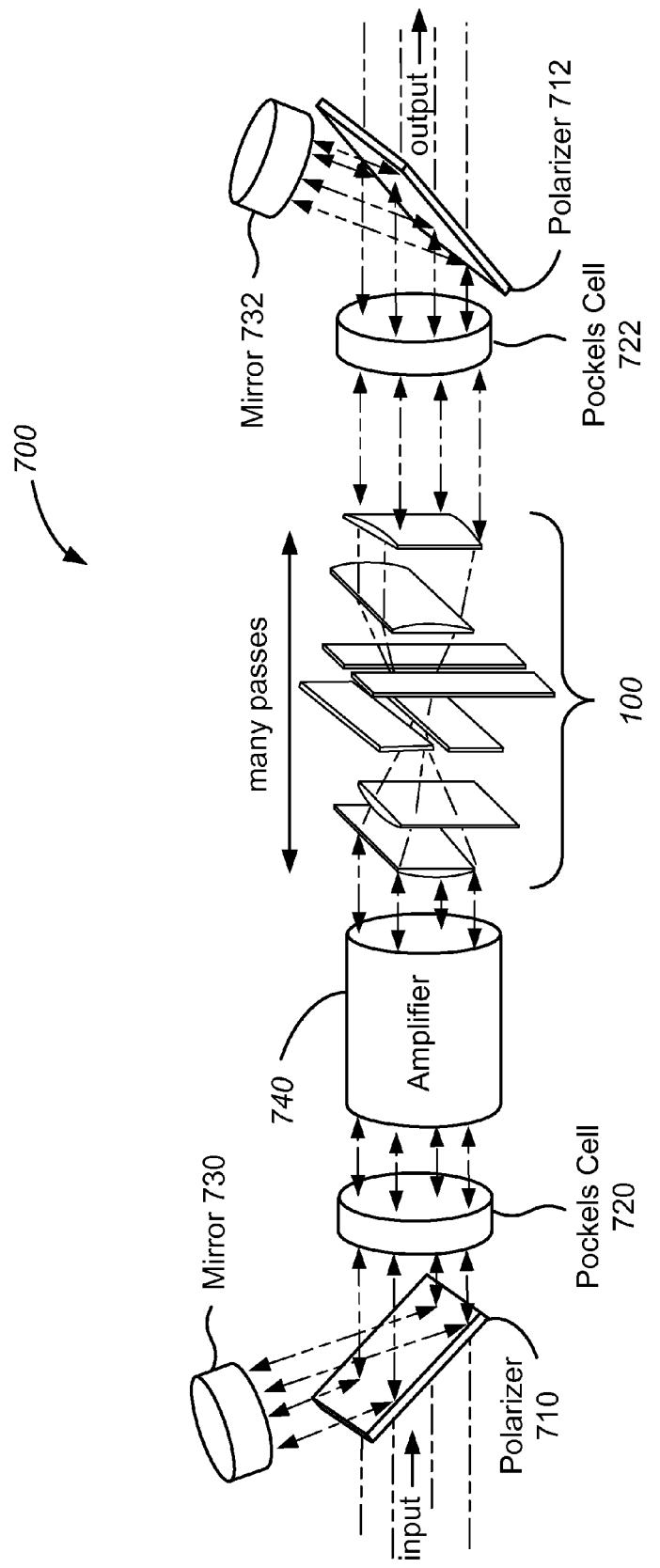
FIG. 7 is a simplified diagram of a multi-pass amplifier according to another embodiment of the present invention.

FIG. 7 is a simplified diagram of a multi-pass amplifier according to another embodiment of the present invention. As illustrated in FIG. 7, this embodiment utilizes the spatial filter 100 discussed in relation to FIG. 1 with a multiple pass amplifier. The spatial filter 100 includes a single horizontal slit and a single vertical slit and provides for filtering of the beam as it propagates through the many-pass amplifier 700. As illustrated in FIG. 7, the beam passes through the same vertical and horizontal slits over and over again during amplification. Passing the beam through the same slits many times is made possible by embodiments of the present invention since the intensity at the slits is below the plasma generation threshold. Accordingly, the pinhole closure phenomena discussed above does not occur. Thus, embodiments of the present invention contrast with conventional spatial filters using spherical lenses and pinhole filters, as the plasma generated on the previous pass would likely still be present during the subsequent pass. By enabling the amplified beam to make many passes through the amplifier, the size of the front-end laser can become reduced in comparison to conventional approaches, thereby reducing costs.

Referring to FIG. 7, the input beam is injected from the left side of the figure with a "p" polarization, enabling the input beam to be transmitted by polarizer 710. The beam then passes through polarizer 710 as well as Pockels cell 720, which is operated at low voltage so that the polarization remains "p" after passing through this Pockels cell. The beam then passes through the amplifier 740 for the first time and then reaches spatial filter 100. As described in relation to FIG. 1, cylindrical lenses and slit filters are utilized in this embodiment. Additional embodiments utilize the spatial filter illustrated in FIG. 3 in place of spatial filter 100. One of ordinary skill in the art would recognize many variations, modifications, and alternatives.

The amplified beam passes through Pockels cell 722. Since this Pockels cell is operated at full voltage, the polarization is rotated from "p" to "s" and the beam is reflected from polarizer 712 to mirror 732. After reflection by mirror 732, the beam returns to polarizer 712, where the beam is reflected back towards Pockels cell 722, which is still operated at full voltage. Therefore, Pockels cell 722 rotates the polarization back to the "p" polarization. After passing through spatial filter 100 again, the light is amplified a second time in amplifier 740. The beam then passes though Pockels cell 720, which is now at full voltage, rotating the polarization of the beam to the "s" polarization. The "s" polarized beam is reflected by polarizer 710 to mirror 730, which then reflects the beam back through the optical chain. As long as Pockels cells 720 and 722 remain at full voltage, so that the polarization is always "s" at polarizers 710 and 712, the amplified beam will continue to circulate between mirrors 730 and 732. The number of passes though the amplifier can be determined by the system operator and is arbitrary in a particular embodiment. An advantage of the many passes provided by the embodiment illustrated in FIG. 7 is greater amplification of the beam and therefore use of a smaller front-end laser for producing the input pulse, thereby reducing system cost. Additionally, more passes can have the added benefit of improving extraction efficiency of energy from the amplifier when the saturation fluence of the gain medium is high relative to the damage fluence of the optics. Efficient extraction is possible even with the output beam fluence below the saturation fluence, provided that the amplifier gain is relatively low and sufficient passes are made so that the accumulated fluence passed through the amplifier is several times the saturation fluence.

In order to extract the beam from the multi-pass amplifier, the voltage at Pockels cell 722 is reduced to zero, enabling the beam polarization to be "p" at polarizer 712. The "p" polarized beam is transmitted through polarizer 712 and is output from the amplifier.

It should be noted that each time the beam passes through the optical beam path, the beam is cleaned up by the spatial filter 100. As discussed above, the same slits are re-used on each pass, which is possible with slits (but not pinholes) since the fluence of the laser beam intensity at the slit edge remains below the plasma production threshold, thereby preventing pinhole closure (or its equivalent for slits), which would interfere with the beam on passes subsequent to the first pass.

The amplifiers illustrated in FIGS. 5-7 are particular implementations that can improve operating parameters by use of the spatial filters described herein. However, the present invention is not limited to these particular implementations and other amplifier configurations can also benefit through the integration of spatial filters with sets of cylindrical lenses or astigmatic lenses and slit filters as components of the amplifier system. Merely by way of example, multi-pass amplifiers using Yb:SrF$_2$ gain media are systems that can benefit from the integration of the spatial filters described herein. By way of a second example, spatial filters using cylindrical or astigmatic lenses can be integrated in a "ring laser" design, in which the beam makes many passes through a closed loop and in which the number of passes is controlled by one or more Pockels cells and polarizers. In this embodiment, the beam passes through the spatial filter once, in the same direction, on each round trip the beam makes through the closed loop. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A spatial filter comprising:
    a first filter element disposed along an optical path and comprising:
        a first pair of cylindrical lenses separated by a first distance, each of the first pair of cylindrical lenses having a first focal length; and
        a first slit filter positioned between the first pair of cylindrical lenses; and
    a second filter element disposed along the optical path, wherein the second filter element shares a common portion of the optical path with the first filter element, the second filter element comprising:
        a second pair of cylindrical lenses separated by a second distance, each of the second pair of cylindrical lenses having a second focal length; and
        a second slit filter positioned between the second pair of cylindrical lenses.

2. The spatial filter of claim 1 wherein the first focal length and the second focal length is a same focal length.

3. The spatial filter of claim 2 wherein a spacing between the first slit filter and the second slit filter is a predetermined distance less than the same focal length.

4. The spatial filter of claim 3 wherein a distance between a first lens of the first pair of cylindrical lenses and a second lens of the second pair of cylindrical lenses is equal to twice the same focal length plus the predetermined distance.

5. The spatial filter of claim 1 wherein an orientation of the first pair of cylindrical lenses is orthogonal to the second pair of cylindrical lenses.

6. The spatial filter of claim 1 wherein the first slit filter is orthogonal to the second slit filter.

7. The spatial filter of claim 1 wherein a beam aspect ratio is equal at a first lens of the first pair of cylindrical lenses and a second lens of the second pair of cylindrical lenses.

8. The spatial filter of claim 1 wherein at least one optical element of the first filter element is positioned between the second pair of cylindrical lenses.

9. The spatial filter of claim 1 wherein at least one optical element of the second filter element is positioned between the first pair of cylindrical lenses.

10. The spatial filter of claim 1 wherein a distance from a first lens of the first pair of cylindrical lenses and a first lens of the second pair of cylindrical lenses is less than the first focal length.

11. The spatial filter of claim 1 wherein a distance from a second lens of the first pair of cylindrical lenses and a second lens of the second pair of cylindrical lenses is less than the second focal length.

12. The spatial filter of claim 1 wherein a first lens of the second pair of cylindrical lenses is positioned between a first lens of the first pair of cylindrical lenses and the first slit filter.

13. The spatial filter of claim 1 wherein a second lens of the first pair of cylindrical lenses is positioned between the second slit filter and a second lens of the second pair of cylindrical lenses.

14. The spatial filter of claim 1 wherein the first slit filter and the second slit filter are positioned between a first lens of the second pair of cylindrical lenses and a second lens of the first pair of cylindrical lenses.

15. The spatial filter of claim 1 wherein the first slit filter is positioned between the second pair of cylindrical lenses.

16. The spatial filter of claim 1 wherein the second slit filter is positioned between the first pair of cylindrical lenses.

17. The spatial filter of claim 2 wherein a beam aspect ratio is equal at a first lens of the first pair of cylindrical lenses and a second lens of the second pair of cylindrical lenses.

18. The spatial filter of claim 1 wherein an image present at a first plane a first predetermined distance from a first lens of the first pair of cylindrical lenses is imaged at a second plane a second predetermined distance from a second lens of the second pair of cylindrical lenses.

19. The spatial filter of claim 18 the first plane is upstream of the first filter element and the second plane is downstream of the second filter element.

20. The spatial filter of claim 1 wherein a beam aspect ratio is unequal at a first lens of the first pair of cylindrical lenses and a second lens of the second pair of cylindrical lenses.

* * * * *